April 17, 1951        E. D. SCOTT        2,549,133
HOOD SUPPORT AND LOCK
Filed March 10, 1948        4 Sheets-Sheet 1
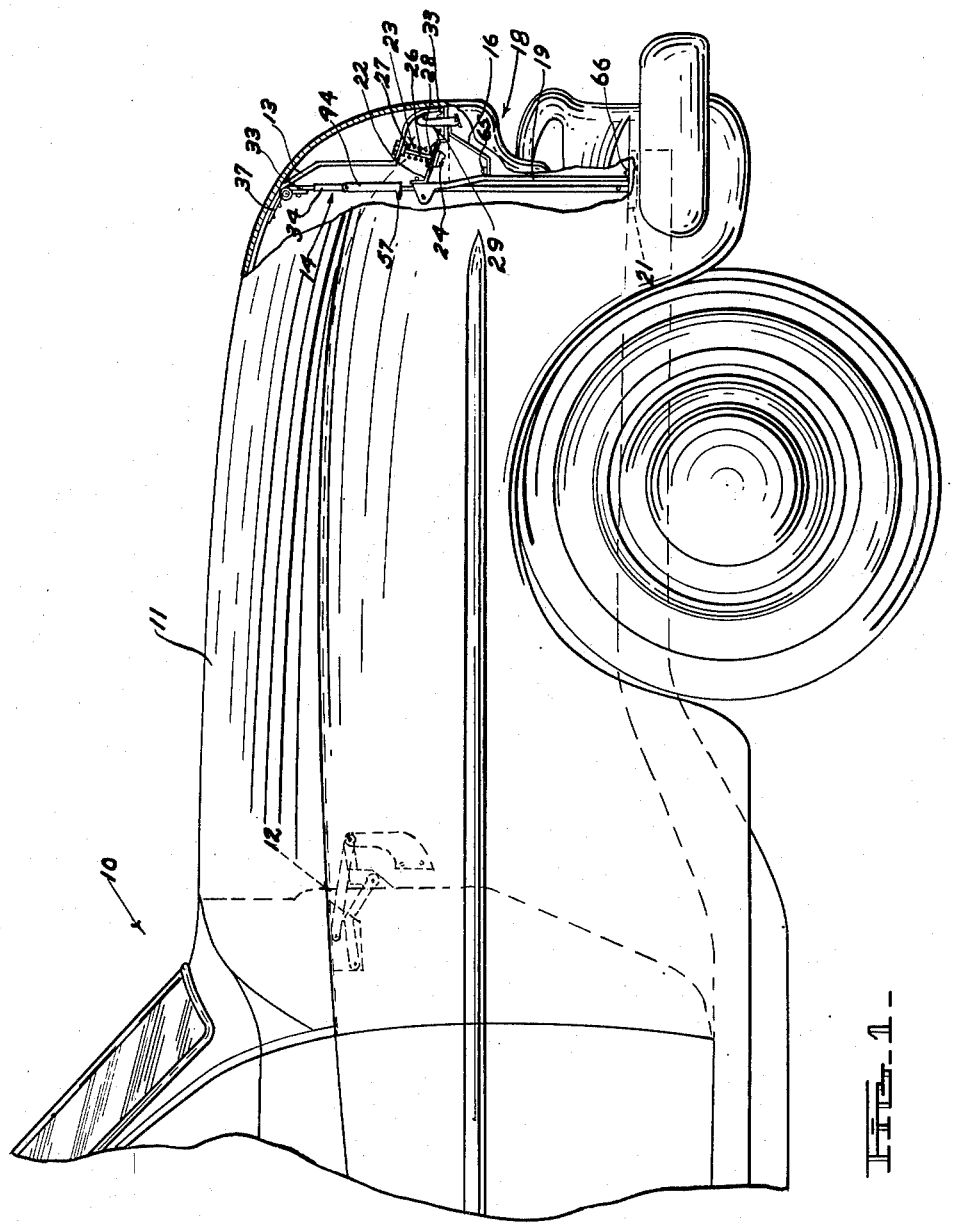
E. D. SCOTT
INVENTOR.
BY
ATTORNEYS April 17, 1951  E. D. SCOTT  2,549,133
HOOD SUPPORT AND LOCK
Filed March 10, 1948  4 Sheets-Sheet 2
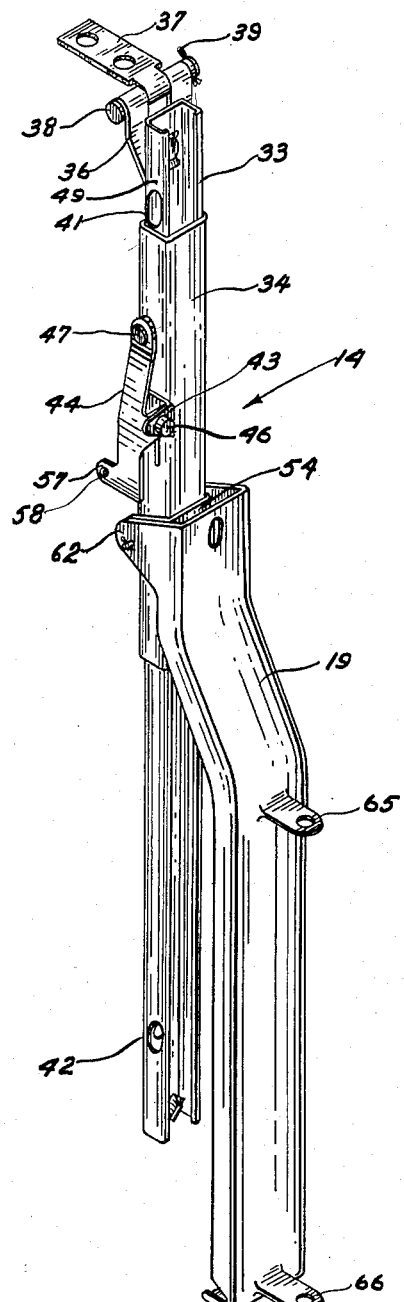
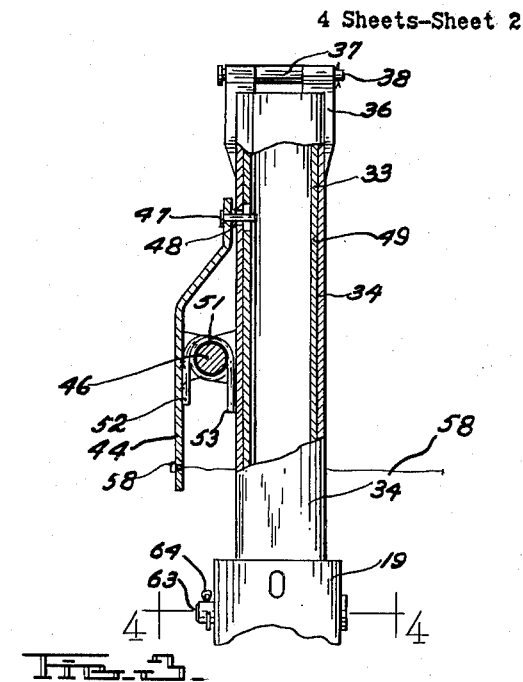
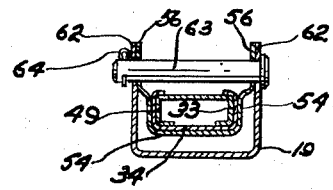
E. D. SCOTT
INVENTOR.
ATTORNEYS April 17, 1951     E. D. SCOTT     2,549,133
HOOD SUPPORT AND LOCK
Filed March 10, 1948     4 Sheets-Sheet 3
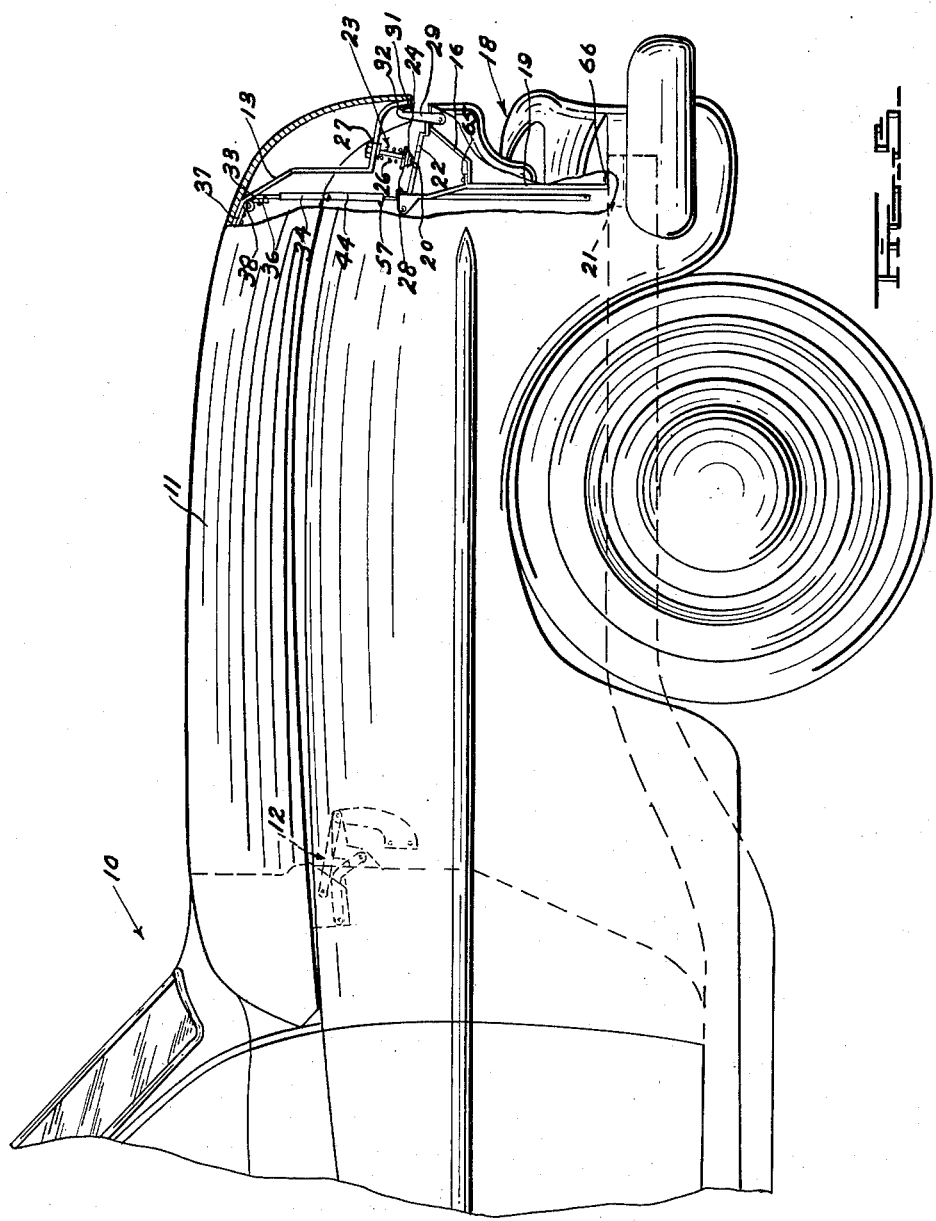
E. D. SCOTT
INVENTOR.
BY E. C. McRae
J. R. Faulkner
F. H. Oster
ATTORNEYS April 17, 1951  E. D. SCOTT  2,549,133
HOOD SUPPORT AND LOCK
Filed March 10, 1948  4 Sheets-Sheet 4
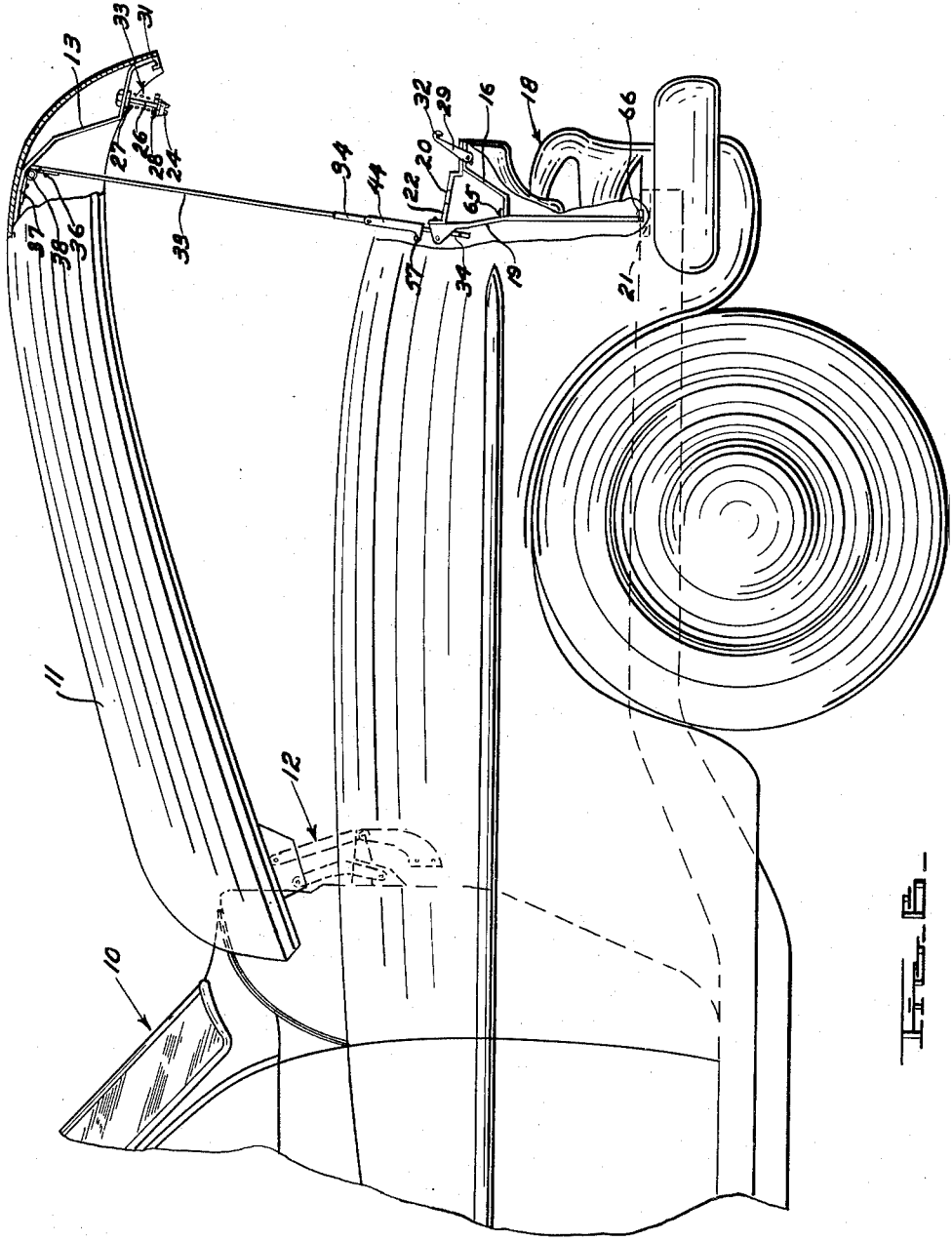
E. D. SCOTT
INVENTOR.
BY
ATTORNEYS Patented Apr. 17, 1951

2,549,133

UNITED STATES PATENT OFFICE 2,549,133

HOOD SUPPORT AND LOCK

Edwin Daniel Scott, Plymouth, Mich., assignor to Ford Motor Company, Dearborn, Mich., a corporation of Delaware Application March 10, 1948, Serial No. 14,062

3 Claims. (Cl. 180—69)

This invention relates generally to hood supporting and locking mechanisms for an automotive vehicle and more specifically to a combined hood supporting and locking mechanism.

A need has long been apparent in the automotive industry for a combined hood support and hood locking means that could be economically produced under mass-production techniques. The trend in automotive design is toward the production of a wide, low vehicle that requires the use of a broader and consequently heavier hood construction than has been generally used in automobile engineering. This advancement in automotive design requires a hood support that will provide a positive supporting means.

Varying types of hood supports and hood-locking means are now employed by the automotive industry. The hood support and hood-locking means are generally separate units under present production practices and consequently require considerably more time and expense, both in production and installation, than would be incurred if the units were combined into one assembly.

It is therefore an object of this invention to provide a combined hood-locking means and hood-supporting means that will provide a safe structure for holding the hood in the open position as well as a positive unit for locking the hood. The hood support and hood-locking mechanism herein shown and described has the advantage of a positive locking means in the open position which eliminates any chance that the hood might be blown, or jarred shut, while repairs are being made in the engine compartment.

Another advantage to the use of a combined hood support and hood-locking means is the positioning of the unit in such a manner that both sides of the engine compartment are unobstructed by rods, or springs which have normally been employed to hold the hood open. This feature of the proposed hood jack facilitates repair and maintenance of the automobile engine and operating equipment which is conventionally located under the hood.

A further advantage of this invention is the provision for employing an inexpensive but positive hood-locking means. The conventional hood-locking mechanism has a high production cost, due to the manufacture and assembly of the intricate locking and tripping mechanism employed. The locking mechanism that is incorporated in the invention as shown and described is simple, inexpensive, and easily assembled and repaired.

Other objects and advantages of the invention will become apparent as the description proceeds, especially when considered in connection with the drawings, in which:

Figure 1 is a side elevation of the front portion of an automobile, a part of which has been cut away to show the hood support in the closed position.

Figure 2 is a perspective view of the hood support in a partially open position.

Figure 3 is a front elevation of a portion of the hood support which has been partially cut away to show the locking mechanism.

Figure 4 is a cross sectional view taken on the line 4—4 of Figure 3.

Figure 5 is a side elevation of the front portion of an automobile similar to Figure 1 showing the hood in an unlocked position.

Figure 6 is a view similar to Figure 1 showing the hood in the open and locked position.

Reference is now made to the drawings, and more particularly to Figure 1, in which the reference character 10 denotes an automobile having a hood 11 which is pivotally mounted to the automobile 10 by a hinge member 12. A bracket 13 is attached to the hood 11 and forms a longitudinal hood-bracing member that extends from the front of the hood to the rear edge of the hood. Attached to the bracket 13 in a conventional manner is a hood support 14 which operates in conjunction with the hinge member 12 as the hood is opened and closed.

The hood support 14 is pivotally mounted to a bracket 19 which replaces the bracket customarily used to brace the grille 18. The bracket 19 has two flanges 65 and 66 provided in predetermined positions on one surface of the bracket as best shown in Figure 2. The baffle 16 is secured at one end to the grille 18 and at the other end to the flange 65 by bolting or other conventional means. The flange 66 is secured to the frame member 21 in a similar manner. The bracket 19 is also bolted to the panel 22. The bracket 19 therefore provides not only a bracing member for the grille 18, but a bracket which is firmly attached to the body of the vehicle upon which the channel member 34 is pivotally mounted. This construction is best shown in Figures 1, 5, and 6.

A hood-centering pin 23 is rigidly bolted to the hood brace 13. The centering pin 23 has a tapered end 24 having a considerably larger diameter than the shaft 26 of the pin 23. A spring 27 is placed over the shaft 26 and is held securely in place by a washer 28, which is seated against the tapered end 24 of the centering pin 23. A positioning hole 20, as shown in Figure 6, is provided in the panel 22 which receives the tapered end 24 of the centering pin 23 to correctly position the hood 11 in the closed position.

As the hood is closed, the pin 23 is received by the positioning hole 20 which centers the hood in the closed position and removes any off-center strain from the hood support. When the centering pin is received by the positioning hole 20, the washer 28 on the centering pin 23 becomes seated on the panel 22, thereby compressing the spring 27. As the hood is released for opening, the spring 27 lifts the hood a sufficient distance to enable the operator to obtain a handhold under the front edge of the hood to facilitate lifting the hood to the open position.

A safety catch 29 of conventional design is secured to the baffle 16 to limit the hood opening when the hood is released. A hooked portion 32 is provided on the safety catch 29 which engages a flange 31 provided on the inner edge of the brace 13 to limit the upward movement of the hood as the hood lock is released. This safety catch prevents the hood from being blown open when the hood is accidentally released while the vehicle is in motion. As shown in Figure 5, the safety catch may easily be released by pushing inwardly on the safety catch until the hooked portion is no longer in contact with the flange 31, and the hood 11 may then be swung upwardly to the open position.

As best shown in Figure 2, the hood support 14 has a telescoping member 33 which is slidably mounted in the channel member 34. A female hinge leaf 36 is attached to the upper end of the telescoping member 33 by riveting, bolting, or other conventional means. The male hinge leaf 37 is received in the slot provided in the hinge leaf 36 and is swingably secured in position by the hinge pintle 38 which is held securely in place by the cotter key 39, or by other conventional means. The spring leaf 37 is secured to the hood brace 13 by bolting, welding, or other conventional means and provides a pivotal mounting means between the hood 11 and the telescoping arm 33.

Two locking holes 41 and 42 are provided on one side of the telescoping arm 33 at predetermined points intermediate the ends of the telescoping member. The locking hole 41 provides a locking position when the telescoping arm is completely telescoped, while the locking hole 42 provides a locking position when the telescoping member is completely extended.

The channel member 34 in which the telescoping member 33 is slidably mounted has a mounting bracket 43 secured thereto which pivotally supports a locking lever 44 on the pin 46 which is secured in a conventional manner. A locking pin 47 is secured to the locking lever 44 and projects through a hole 48 in the channel member 34 as shown in Figure 3.

A coil spring 51 is mounted on the pin 46 in such a manner that the ends 52 and 53 of the spring press against the locking lever 44 and the channel member 34, respectively, as best shown in Figure 3. The spring 51 loads the lever 44 in such a manner that the locking pin 47 is forced through the hole 48 in the channel member 34 and maintains the locking pin 47 in frictional contact with the outer surface 49 of the telescoping member 33. As the telescoping member 33 is operated, the locking pin 47 slides along the surface 49 until it engages and is forced into one of the locking holes 41 and 42 as shown in Figure 3. It is readily apparent that the locking mechanism described and shown is simple, effective, and economical to produce and repair.

A mounting member 54, as shown in Figures 2 and 4, having ears 56, is welded to the channel member 34 intermediate the ends of the channel member. Aligned holes are provided in the ears 56 which coincide with the aligned holes formed in the ears 62 provided on the brace 19. A pin 63 is inserted through the holes in the ears 56 of the mounting member 54 and through the holes in the ears 62 on the brace 19 to provide pivotal movement of the channel member 34 in relation to the brace 19. The pin 63 is secured in position by a cotter key 64 or other conventional means as shown in Figure 4.

When the hood of the vehicle is closed and locked as shown in Figure 1, the telescoping arm 33 is fully telescoped within the channel member 34 and the locking pin 47 is projected through the locking hole 41 in the telescoping member 33 securely locking the hood 11. The centering pin 23 projects through the centering hole provided in the dust shield 22 and the washer 28 is seated against the dust shield 22 compressing the spring 27.

Releasing the hood, as shown in Figure 5, is accomplished by pulling on the hood release mounted on the instrument panel (not shown) of the vehicle. A Bowden wire 58, as shown in Figures 2 and 3, extends from the hood release to the ear 57 provided on the locking lever 44. As the hood release is pulled, a resulting movement of the Bowden wire 58 is accomplished and the locking lever 44 is pivoted on the pin 46 which pulls the locking pin 47 from the locking hole 41 in the telescoping member 33, as shown in Figure 2. The spring 27 on the centering pin 23 lifts the hood until the safety catch 29 engages the flange 31 of the longitudinal bracing member 13.

Releasing the safety catch 29 is accomplished by pushing it inward, which permits the lifting of the hood to the open position. As the hood is raised, the telescoping arm 33 operates slidably in the channel member 34. The locking pin 47 slides against the surface 49 of the telescoping member 33 until it projects into the locking hole 42 in which position the telescoping member 33 is fully extended. When the pin 47 is positioned in the locking hole 42, the hood is securely locked into the open position, as shown in Figure 6. As the hood 11 is opened, the hinges 12 swing the rearward edge of the hood upward and forward to clear the fender surfaces. The forward movement is compensated for in the hood support by pivotally mounting the channel member 34 to the brace 19, as has been previously described. The pivotal movement provided has sufficient scope to adequately provide the swinging movement required by the hood construction.

In closing the hood, an inward pressure on the ear 57 of the locking lever 44 will release the locking pin 47 from the locking hole 42. The hood must be supported during the closing operation, as dropping the heavy hood from an open to a closed position would impart undue strains on the supporting and locking mechanisms as well as on the hood itself. The hood should be manually supported until the spring 27 on the centering pin 23 bears the weight of the hood, as shown in Figure 5. In this position the hood is properly centered by the centering pin 23. A sharp downward push on the hood will then lower the hood until the locking pin 47 engages the locking hole 41 in which position the hood is securely locked, as shown in Figure 1.

It has been found that the hood support and lock that have been described have proven satisfactory under all conditions of use. They are safe, satisfactory in operation, and economical to produce and install. The locking mechanism is simple and does not require the intricate and expensive assembly that is commonly used in hood-locking assemblies. The production costs of the proposed hood support are considerably less than the cost of producing the conventional type of hood lock, because of the employment of fewer parts that require but little adjustment. As has been shown in Figure 3, the locking mechanism employed in this invention is simple, easily constructed and manufactured, and provides a secure means of holding the hood in either an open or closed position.

It will be understood that the invention is not limited to the specific construction shown and described, but that various changes and modifications may be made without departing from the spirit and scope of the invention as defined in the appended claims.

What is claimed is:

1. In an automotive vehicle having a body and a hood hinged at its rearward edge to said body so that the forward edge of said hood moves upwardly as the hood is opened, a member pivotally connected to said body, a second member telescopically and slidably engaging said first member and having its upper end pivotally connected to said hood at a point located substantially vertically above the pivotal connection of said first member to said body so that the telescopic strut composed of said first and second members is continuously elongated as said hood is opened and assumes a substantially vertical position both in the closed and open positions of the hood, locking openings formed in one of said members adjacent the upper and lower ends thereof, a locking lever mounted upon the other of said members and engageable with the lower of said openings to hold and support said hood in its open position and alternatively engageable with the upper of said openings to lock said hood in its closed position, and means connected to said lever to effect a remote control of the releasing of said locking lever.

2. In an automotive vehicle having a body and a hood hinged at its rearward edge to said body so that the forward edge of said hood moves upwardly as the hood is opened, a reinforcing bracket vertically mounted upon said body, a member pivotally connected to the upper end of said reinforcing bracket, a second member telescopically and slidably engaging said first member and having its upper end pivotally connected to said hood at a point located substantially vertically above the pivotal connection of said first member to said reinforcing bracket so that the telescopic strut composed of said first and second members is continuously elongated as said hood is opened and assumes a substantially vertical position both in the closed and open positions of the hood, locking openings formed in one of said members adjacent the upper and lower ends thereof, a locking lever mounted upon the other of said members and engageable with the lower of said openings to hold and support said hood in its open position and alternatively engageable with the upper of said openings to lock said hood in its closed position, and means connected to said lever to effect a remote control of the releasing of said locking lever.

3. In an automotive vehicle having a body and a hood hinged at its rearward edge to said body so that the forward edge of said hood moves upwardly as the hood is opened, a channel shaped reinforcing bracket mounted vertically upon said body and having a pair of transversely spaced ears, a channel shaped member embraced by the ears of said reinforcing bracket and pivotally connected thereto, a second channel shaped member arranged in opposed relationship to said first channel shaped member and telescoping therewith, said second member having its upper end pivotally connected to said hood at a point located substantially vertically above the pivotal connection of said first member to said reinforcing bracket so that the telescopic strut composed of said first and second members is continuously elongated as said hood is opened and assumes a substantially vertical position both in the closed and open positions of the hood, said second channel shaped member being substantially longer than said first channel shaped member so that the upper ends of said members substantially coincide when said hood is in its closed position and the second member extends upwardly beyond the top of said first member when the hood is open, locking openings formed in said second channel shaped member adjacent the upper and lower ends thereof, a locking lever mounted upon said first channel shaped member and engageable with the lower of said openings to hold and support said hood in its open position and alternatively engageable with the upper of said openings to lock said hood in its closed position, and means connected to said lever to effect a remote control of the releasing of said locking lever.

EDWIN DANIEL SCOTT.

REFERENCES CITED

The following references are of record in the file of this patent:

UNITED STATES PATENTS

| Number | Name | Date |
|---|---|---|
| 1,598,868 | Lundelius | Sept. 7, 1926 |
| 2,001,507 | Stribling | May 14, 1935 |
| 2,145,968 | Bozarth | Feb. 7, 1939 |
| 2,268,741 | Dall | Jan. 6, 1942 |
| 2,388,336 | Miller | Nov. 6, 1945 |

FOREIGN PATENTS

| Number | Country | Date |
|---|---|---|
| 116,206 | Great Britain | June 6, 1918 |
| 527,531 | Great Britain | Oct. 10, 1940 |